July 4, 1950      O. J. CUMMINGS      2,514,204
DRIER FEED DISTRIBUTION
Filed Jan. 30, 1946
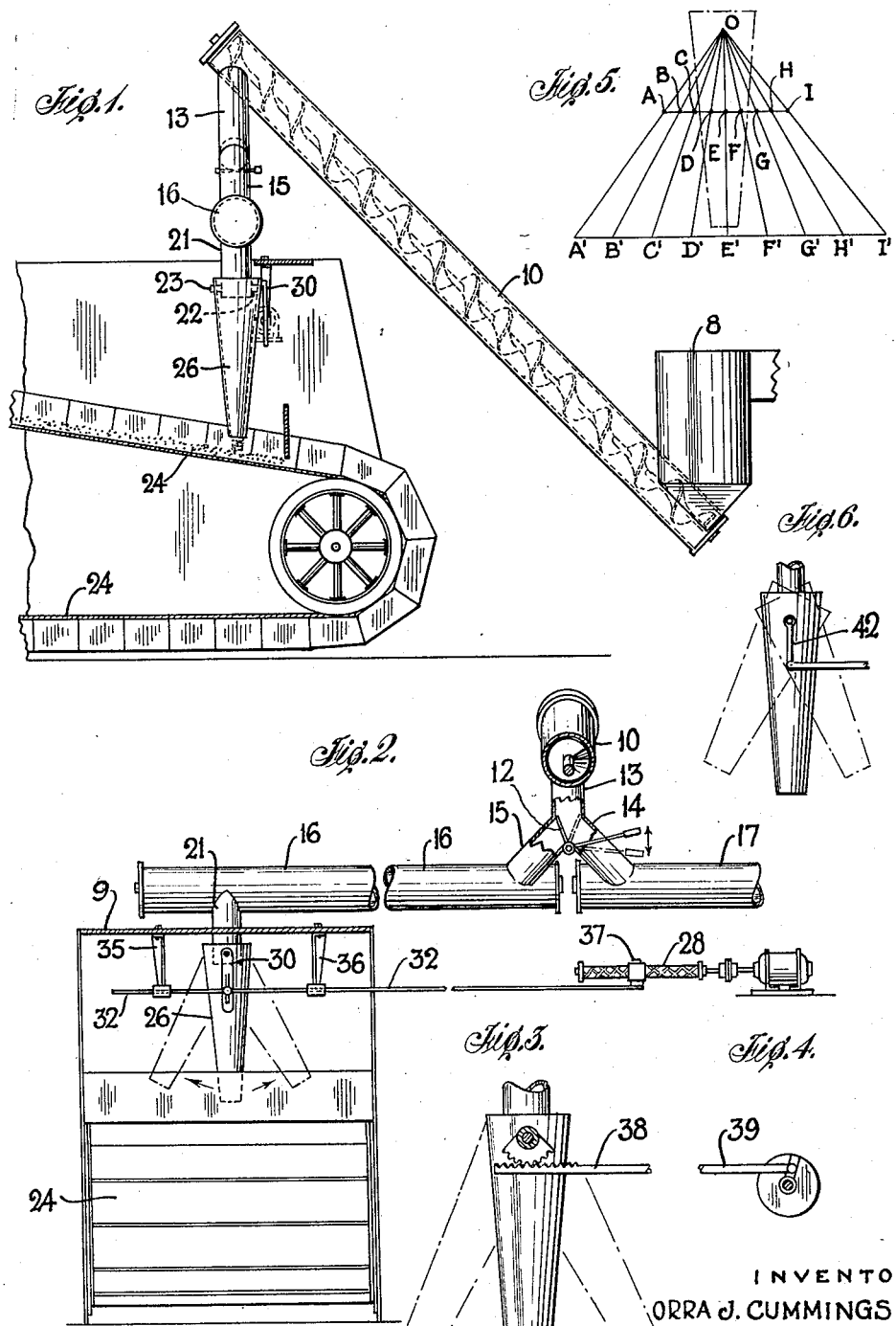
INVENTOR
ORRA J. CUMMINGS
ATTORNEYS Patented July 4, 1950

2,514,204

UNITED STATES PATENT OFFICE 2,514,204

DRIER FEED DISTRIBUTION

Orra J. Cummings, Akron, Ohio, assignor to The Firestone Tire & Rubber Company, Akron, Ohio, a corporation of Ohio Application January 30, 1946, Serial No. 644,308

1 Claim. (Cl. 214—35)

This invention relates to the distribution of fine particle materials upon a belt-like conveyor and particularly to the deposition of rubber or synthetic rubber particles upon a continuous dryer belt.

In the recent construction of many large plants for producing synthetic rubber of the so called GR-S type, the standard layout called for continuous drying of the freshly coagulated polymerizate. The dryer design most favorably considered and widely used is the horizontal belt conveyor type in which the wet comminuted or pelletized material is deposited on the conveyor at one end of the dryer and discharged at the opposite end. The dryer is divided into several zones, each being controlled independently as to draft and temperature. The belt passes through the various zones through small slits in the baffles which separate the zones. The belt itself is of an open construction, usually constituted of many metal plates hinged together, perforated to such a degree that heated air or gas may pass through the same without hindrance. The material being dried is supported on the upper side of the belt, and in order to render this type of dryer efficient and practical, should be of such texture and consistency that air can be passed through it readily.

Any condition which causes lack of uniformity in the thickness, density, or particle size of the layer of granular comminuted synthetic rubber so deposited on the conveyor for drying, results in irregularly dried product. The heated gas or air, as the drying medium, tends to follow the path of least resistance, and therefore flows through the thinnest or least dense portions of the said layer. In the operation of these dryers, it has often been observed that when the dryer conveyor carries an unevenly distributed burden, that the product includes portions which were only partly dried while other portions were overheated to the point of fusion and agglomeration.

The condition of the layer deposited on the dryer belt is dependent as to density, uniformity, and particle size, on the apparatus which feeds the dryer. For example, one apparatus often used consists of two endless chains interconnected by and extending crosswise therebetween, angle-ironlike slats of a length approximately equal to the width of the dryer belt. This apparatus is installed so that said slats dip into a hopper, pick up a load of rubber particles, and carry the particles upward in a manner similar to a grain elevator, to a point above the dryer conveyor, where they unload as they start downward. The rubber particles are of various sizes and, as they discharge into the said hopper from a comminuter or conveyor, they tend to segregate as to sizes, with the largest particles rolling to the farthest points in the hopper. The apparatus described above for feeding the dryer does not correct the segregation which occurs in the hopper. The rubber particle layer thereafter deposited in the dryer contains coarser particles toward the outer edges of the dryer belt. Moreover, this apparatus tends to give a thicker and more dense condition of the layer in the center of the belt.

The moisture in the wet rubber particles contains in solution any one of the several coagulating materials commonly used, such as solutions of aluminum sulfate, sodium chloride, barium chloride, magnesium sulfate, sulfuric acid and hydrochloric acid. These materials are without exception, highly corrosive, and tend to cause excessive wear on metal to metal surfaces such as in bearings and hinges.

An apparatus such as the one just described contains many individual parts and is subject to frequent breakdowns and replacements.

It is therefore an object of the present invention to provide apparatus for forming layers of wet material on continuous dryer conveyors, characterized by great uniformity as to density, thickness, and distribution of particle size. It is an object also, through the more uniform heating made possible by the present invention, to produce dried synthetic rubber coagulum of greater uniformity of physical properties than has been heretofore obtained in commercial quantities. It is a further object to provide an apparatus mechanically simple, easy to maintain, and relatively unaffected by corrosion.

The foregoing and other objects will be apparent from the accompanying specification, when considered in relation to the accompanying drawing, wherein:

Fig. 1 is a diagrammatic view in elevation showing an embodiment of the invention in combination with a screw conveyor and a dryer belt conveyor;

Fig. 2 is a side view in elevation of the apparatus shown in Fig. 1;

Fig. 3 illustrates another embodiment of the invention, employing an alternative means for causing oscillation of a distributing chute;

Fig. 4 illustrates an oscillating means which may be employed in lieu of oscillating means shown in Fig. 2;

Fig. 5 is a graphical representation of the principle by which the invention achieves even particle distribution on the dryer conveyor;

Fig. 6 illustrates a crank means which may be used in lieu of the crank means shown in Fig. 2 and the rack and pinion apparatus shown in Fig. 3.

Referring in detail to the drawing, in which similar numerals refer to similar parts throughout the several views, the synthetic rubber particles are collected in a hopper 8 as they are discharged from a comminuter or pelletizer (not shown). The embodiment as shown in Fig. 1 illustrates the use of a screw conveyor 10 to elevate the synthetic rubber particles to a spout 13. Chutes 14 and 15, as best shown in Fig. 2, project from a spout 13 in inverted Y arrangement. The synthetic rubber is directed into either of the said chutes by a butterfly damper 12 installed within the spout 13. Conveyors 16 and 17 indicate an arrangement whereby two or more dryer belts may be charged with wet rubber crumb from a single coagulating unit, only one dryer belt 24 being shown. As the rubber crumb is directed, for example, through member 15 of the Y construction, it is charged into and carried by a screw conveyor, not shown, in housing 16 and into a communicating annular discharge chute 21. Near the lower extremity of chute 21, shafts 22 and 23 are exteriorly mounted on diametrically opposite sides of chute 21 on a horizontal axis for the pivotal support of a depending distributing chute 26.

Chute 26, preferably of frustro-conical shape, may be supported by suitable bearings rotatably mounted on shafts 22 and 23. The smaller end of chute 26 projects downward and oscillates in any desired arc of, for example, in the range of 45 to 90 degrees. The larger end of chute 26 is of larger diameter than the chute 21 and in concentric and telescopic relationship with the lower portion of chute 21. As the chute 26 swings back and forth in a predetermined arc, wet rubber particles discharged from chute 21 are received without any possibility of escape by the chute 26 regardless of the angular relationship which occurs between the two chutes 21 and 26 in obtaining the arcuate path of the lower end of chute 26. A further reason for the larger diameter of chute 26 is that the upper end of chute 26 is thus free to pivot about the lower end of chute 21 without the sides of either of the two chutes engaging the other.

Since it is a prime object to deposit a layer of uniform thickness upon the dryer belt, the cycle which is executed by the lower end of chute 26 is to be adjusted so that the rubber particles are deposited at a constant rate. It is found that a highly satisfactory cycle is produced through the reciprocating motion obtained from a power driven double helical threaded transverse screw 28 in fixed position, said reciprocating motion being transmitted to a slotted crank arm 30 rigidly attached to the chute 26. A reciprocating rod 32, which forms the connecting element between the double helical screw 28 and the slotted crank arm 30, is supported and limited to reciprocating motion only, by hangers 35 and 36 rigidly attached to a support 9. The length of the arc through which the chute rotates is determined by the length of the helical screw 28. The above reciprocating arrangement produces an accurately uniform rate of deposition of rubber particles upon the dryer conveyor. It will be seen upon examination of this apparatus that, although angular velocity of the distributing chute varies through a definite cycle, the target pattern on the dryer conveyor which receives the rubber particles travels at a uniform rate back and forth across the said conveyor. This principle is illustrated by the geometrical diagram shown in Fig. 5. Referring to Fig. 5, it will be seen that line AI is divided into several equal portions, AB, BC, etc. Line AI also corresponds to the path of travel of any fixed position on the reciprocating rod 32, and particularly to the pivot affixed to rod 32 which rotates crank arm 30. The reciprocating movement of pawl 37 which is driven to and fro by the helical threaded transverse screw 28 is exactly duplicated by rod 32. Referring again to Fig. 5, the line A'I' is drawn parallel to line AI. Lines drawn from the vertex O, which correspond to various positions of angular displacement of the chute 26, through points A, B, C, D, E, F, G, H and I, define equal intervals on the line AI, and subtend portions on the line A'I' which are all equal to each other. The line A'I' corresponds to a transverse section of the dryer conveyor belt 24. The lines drawn from the vertex O to line A'I' represent instantaneous positions of the longitudinal axis of the distributing chute at regular time intervals. The trajectory of the rubber particles, as they leave chute 26 at the outer extremities of its arcuate path, tends to form a convex path downward toward the dryer conveyor 24 and thus to offset the geometrically precise pattern described above. However, the distributing chute 26 is positioned just as near to the conveyor 24 as is possible, but not close enough to actually contact or otherwise disturb the layer of particles deposited by it. Therefore, the convexness of the trajectory of the particles as they leave the chute 26 under the conditions herein set forth, is so insignificant as to warrant no modification for any possible distortion such convexness might produce in the deposition principle herein described.

Although the embodiment described above illustrates a specific apparatus for obtaining accurately uniform deposition of particles upon a conveyor passing under it at uniform velocity, it is to be noted that other similar means may be employed to approximate the desirable results obtained through use of said specific embodiment of the invention. For example, the distributing chute 26 may be oscillated by a rack and pinion arrangement 38 as shown in Fig. 3. This latter mechanism does not give as accurate deposition, but serves fairly well within small arcs. Again, a crank arm arrangement 42 such as shown in Fig. 6 may instead be affixed to the distributing chute to bring about particle deposition somewhat superior to that obtained by use of the rack and pinion mechanism but not quite equal to that obtained with slotted crank arm 30. Alternative devices may be substituted for the driving portion of the reciprocating means, such as the one shown in Fig. 4 consisting of an adjustable crank arm 39. The latter apparatus, substituted for the helical threaded reversible screw 28 used in combination with a crank arm 42 affixed to the distributing chute gives excellent results when operating within small arcs. It is to be understood that the driving crank arm 39 would preferably rotate at uniform angular velocity while the driven crank arm 42 oscillates in the arc through which the chute 26 travels.

The frequency at which chute 26 is caused to oscillate is not critical so long as the rate is such that the rubber particles are not given an abnormal trajectory as they leave the chute 26, or are projected against the dryer conveyor in such a manner as to be bounced and scattered about in an unpredictable pattern. A very satisfactory range employed in the practice of the invention is five to ten cycles per minute.

In order to obtain highly uniform layer formation, the relation of the rate of oscillation of the chute 26 to the linear speed of the dryer conveyor 24 should be such as to cause considerable overlapping, say 25 to 75 percent, of the successive transverse paths of particle distribution upon the dryer conveyor. In the practice of this invention, very satisfactory distribution has been obtained from the combination of a distributor oscillation rate of six cycles per minute with conveyor rates of one-third to one and five-eighths feet per minute. Considerable departure from these rates can be tolerated without appreciably affecting the uniformity of distribution.

The present invention is not restricted to any particular method or apparatus for introducing the wet rubber particles into the feed distributor. Although the apparatus for this purpose shown is a screw conveyor, the inventor has successfully used, instead, air propulsion equipment for transporting the said particles to one or several dryers. Other arrangements and types of apparatus for delivering the rubber particles to the feed distributor will be indicated by the specific plant layouts.

Modifications of the invention may be resorted to without departing from the spirit thereof or the scope of the appended claim.

What is claimed is:

In a dryer of the class described, the combination of a dryer having a continuous belt-like conveyor upon which material to be dried is continuously conveyed, a pendulous chute rotatable about an axis aligned approximately with the general direction of movement of the said conveyor supported and suspended directly above the charge-end of the said conveyor, a slotted crank-arm rigidly attached to the said pendulous chute extending approximately radially from the said axis of rotation of the chute, the said slotted portion of the crank arm being most remote from the said axis, a reciprocating means attached in slideable and pivoted relationship to the slotted portion of the said crank arm, means comprising fixed hangers for supporting and limiting the said reciprocating means to rectilinear motion, means for producing in the said reciprocating means in the form of a driven double helically threaded screw for reciprocating rectilinear motion of uniform velocity, a second chute in fixed relation with the dryer foundation serving to support in pivoted relationship the said pendulous chute the diameter of the upper portion of the pendulous chute being sufficiently greater than that of the lower portion of the said second named chute as to permit on account of the concentric relationship between the said portions of the two chutes the pendulous motion of the pendulous chute, and means for delivering to the said supporting chute a continuous supply of wet rubber-like particles.

ORRA J. CUMMINGS.

REFERENCES CITED

The following references are of record in the file of this patent:

UNITED STATES PATENTS

| Number | Name | Date |
| --- | --- | --- |
| 1,741,944 | Linney | Dec. 31, 1929 |
| 1,822,313 | Quiggle et al. | Sept. 8, 1931 |
| 1,845,839 | Hoge | Feb. 16, 1932 |
| 1,972,516 | Fulmer | Sept. 4, 1934 |
| 2,018,843 | Folberth et al. | Oct. 29, 1935 |
| 2,100,150 | Randolph | Nov. 23, 1937 |